US007011175B2

(12) United States Patent
Link et al.

(10) Patent No.: US 7,011,175 B2
(45) Date of Patent: Mar. 14, 2006

(54) METHOD OF ACTIVATING SAFETY DEVICES UTILITY

(75) Inventors: Andrea Link, Munich (DE); Willibald Watzka, Aichach (DE); Jan Urbahn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 52 days.

(21) Appl. No.: 10/843,564

(22) Filed: May 12, 2004

(65) Prior Publication Data

US 2005/0000748 A1    Jan. 6, 2005

Related U.S. Application Data

(63) Continuation of application No. PCT/EP02/10661, filed on Sep. 23, 2002.

(30) Foreign Application Priority Data

Nov. 13, 2001    (DE) ................. 101 55 662

(51) Int. Cl.
*B60R 21/32* (2006.01)
(52) U.S. Cl. .................. 180/274; 180/282; 280/730.2; 280/735
(58) Field of Classification Search ........... 180/274, 180/282; 280/730.2, 735
See application file for complete search history.

(56) References Cited

U.S. PATENT DOCUMENTS

| 5,428,534 | A | 6/1995 | Wetzel et al. |
| 5,969,599 | A | 10/1999 | Wessels et al. |
| 6,100,797 | A | 8/2000 | Mattes et al. |
| 6,305,709 | B1 | 10/2001 | Okada |
| 6,529,810 | B1 * | 3/2003 | Foo et al. ............ 701/45 |

FOREIGN PATENT DOCUMENTS

| DE | 38 16591 A1 | 5/1988 |
| DE | 196 09 077 C1 | 3/1996 |
| DE | 197 19 454 A1 | 5/1997 |
| DE | 198 06 836 C1 | 2/1998 |
| EP | 0987 151 A1 | 3/2000 |

OTHER PUBLICATIONS

International Search Rpt. Nov. 28, 2002.
German Search Rpt. Jul. 8, 2002.

* cited by examiner

*Primary Examiner*—Eric Culbreth
(74) *Attorney, Agent, or Firm*—Crowell & Moring LLP

(57) ABSTRACT

A method for activating safety devices comprising a first longitudinal impact sensor, a second lateral impact sensor and a processing device which activates the safety devices, wherein when the motion signals and/or signals derived therefrom exceed defined threshold values, the threshold values that are critical for the activation of the safety devices are increased in the event of an immediately preceding abnormal motion of the vehicle in the longitudinal direction.

8 Claims, 1 Drawing Sheet

METHOD OF ACTIVATING SAFETY DEVICES UTILITY

The present application is a continuation of International Patent Application No. PCT/EP02/10661, filed Sep. 23, 2002, designating the United States of America and published in German as WO 03/042006, the entire disclosure of which is incorporated herein by reference. Priority is claimed based on Federal Republic of Germany Patent Application No. 101 55 662.4, filed Nov. 13, 2001.

BACKGROUND AND SUMMARY OF THE INVENTION

This invention relates to a method of activating safety devices (airbags, seat-belt tightening systems, roll bars, etc.) having a first impact sensor for supplying a motion signal which represents the motion of the vehicle in the longitudinal direction of motion, having a second impact signal for supplying a motion signal representing the motion of the vehicle in the lateral direction and having a processing device by means of which the safety devices provided for an abnormal motion of the vehicle in the longitudinal or lateral directions are activated when the corresponding motion signals and/or signals derived from them exceed defined threshold values.

The term "first sensor" is also understood to refer to a sensor system comprising an actual motion sensor, e.g., an acceleration sensor and a safing sensor or the like for determining whether a relevant vehicle crash is occurring. The same thing is also true of the term "second sensor."

With known methods, it may happen that a secondary side crash which is in fact occurring may not be recognized if there is a frontal crash. A frontal crash often exhibits great vibrations in the lateral direction of the vehicle. To prevent faulty deployment of the side airbags or the like, deployment of the side airbags is often blocked during a frontal crash.

The object of this invention is to create a method such that an actually occurring secondary side crash will result in deployment of the safety devices actually provided for this purpose while at the same time preventing faulty deployment.

DETAILED DESCRIPTION

Figure 1:
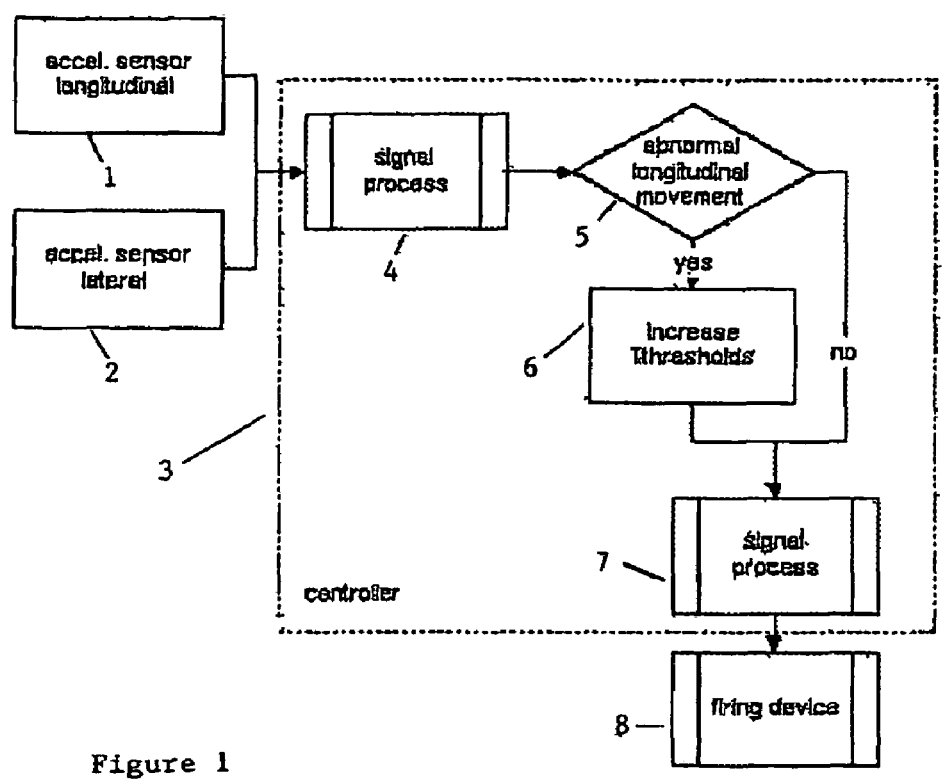
FIG. 1 is a flow chart illustrating safety device activation in accordance with an embodiment of the present invention.

This invention achieves this object with a first longitudinal impact sensor 1, a second lateral impact sensor 2 and a processing device 3 which activates safety devices when motion signals and/or signals derived therefrom in signal process unit 4 exceed defined threshold values, wherein in the event of an immediately preceding abnormal motion of the vehicle in the longitudinal direction (determined at decision point 5), the threshold values that are critical for activation of the safety devices are increased at logic step 6.

Faulty deployment is prevented by raising the threshold values which are critical for activation of the side airbags in the event of an immediately preceding abnormal motion of the vehicle in the longitudinal direction. With a corresponding choice of the modified threshold value, a distinction can be made between vibrations in the lateral direction of the vehicle caused by a frontal crash and the motion signals which are still elevated in the event of an additional secondary side crash. At the same time the system as a whole is not "blind" to the secondary side crash but instead is able to recognize this and respond through appropriate activation of the safety devices provided for this purpose.

If there is an abnormal primary load on the vehicle in the longitudinal direction, then there is a query with an elevated threshold to determine whether a side crash has also occurred at signal process unit 7. The minimum collision severity for activation of the side airbags by firing device 8 is then 30 km/h, for example, in the case of a speed of penetration of a laterally impacting "reaction partner" as the threshold value. In comparison with that, this speed value without a prior frontal crash amounts to 20 km/h, for example.

The processing device thus remains permanently capable of recognizing other serious side crashes (e.g., Euro-NCAP, SINCAP) regardless of which load is acting on the vehicle at that moment. At the latest 64 ms after a frontal crash without a subsequent secondary crash, the system as a whole can be put in the normal state by means of the processing device. Then if another side crash occurs, the processing device will again respond as it would for a primary load.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for activating safety devices of a vehicle, comprising the steps of:
   generating with a first impact sensor a longitudinal motion signal representing a motion in a longitudinal direction of the vehicle;
   generating with a second impact sensor a lateral motion signal representing a motion in the lateral direction of the vehicle; and
   activating the safety devices when a processing device determines that the motion signals or signals derived therefrom exceed defined threshold values,
   wherein the threshold value for activation of the safety devices provided to protect vehicle occupants from abnormal motion in the lateral direction are increased in the event of an immediately preceding abnormal motion of the vehicle in the longitudinal direction.

2. The method as claimed in claim 1, wherein, after the lateral safety device threshold value is increased, the lateral safety device threshold value is reduced after a predetermined period of time.

3. A method for activating safety devices of a vehicle, comprising the steps of:
   generating with a first impact sensor a longitudinal motion signal representing a motion in a longitudinal direction of the vehicle;
   generating with a second impact sensor a lateral motion signal representing a motion in the lateral direction of the vehicle;
   determining with a processing device whether one of the longitudinal motion signal and a signal derived therefrom exceeds a defined longitudinal threshold value;
   determining with the processing device whether one of the lateral motion signal and a signal derived therefrom exceeds a lateral threshold value, wherein if the longitudinal threshold value has been exceeded, the lateral threshold value is set higher than a lateral threshold value when the longitudinal threshold value has not been exceeded; and activating at least one of the safety devices when the lateral threshold value is exceeded.

4. The method as claimed in claim 3, wherein, after the lateral threshold value is set higher than the normal lateral threshold value, the lateral threshold value is reduced after a predetermined period of time.

5. The method as claimed in claim 3, wherein at least one safety device activated when the lateral threshold is exceeded is a side air bag.

6. An apparatus for activating safety devices of a vehicle, comprising:

a first impact sensor for generating a longitudinal motion signal representing a motion in a longitudinal direction of the vehicle;

a second impact sensor for generating a lateral motion signal representing a motion in the lateral direction of the vehicle; and a processing device, wherein the processing device determines whether one of the longitudinal motion signal and a signal derived therefrom exceeds a defined longitudinal threshold value;

determines whether one of the lateral motion signal and a signal derived therefrom exceeds a lateral threshold value, sets the lateral threshold value higher if the longitudinal threshold value has been exceeded than a lateral threshold value set when the longitudinal threshold value has not been exceeded, and activates at least one of the safety devices when the lateral threshold value is exceeded.

7. The safety device activating apparatus as claimed in claim 6, wherein, after the lateral threshold value is set higher, the lateral threshold value is reduced after a predetermined period of time.

8. The safety device activating apparatus as claimed in claim 6, wherein at least one safety device activated when the lateral threshold is exceeded is a side air bag.

* * * * *